Feb. 13, 1951     J. ROBINSON     2,541,291
ROTARY PUMP AND MOTOR HYDRAULIC TRANSMISSION

Filed Aug. 30, 1946     2 Sheets-Sheet 2

INVENTOR.
JAMES ROBINSON
BY
ATTORNEY

Patented Feb. 13, 1951

2,541,291

UNITED STATES PATENT OFFICE 2,541,291

ROTARY PUMP AND MOTOR HYDRAULIC TRANSMISSION

James Robinson, Huntington Woods, Mich., assignor to Vickers Incorporated, Detroit, Mich., a corporation of Michigan Application August 30, 1946, Serial No. 693,987

12 Claims. (Cl. 60—53)

This invention relates to power transmissions, particularly to those of the type comprising two or more fluid pressure energy translating devices, one of which may function as a pump and another as a fluid motor.

More particularly the invention relates to transmissions employed for driving a power plant during starting operations and subsequently to be driven by that power plant when normal operating power plant speeds are obtained. When applied to high speed engines, such as, for example, gasoline turbines and the like, the transmission range is broad requiring high starting torques and low speeds and ending up with low torque at very high speeds.

More particularly the invention relates to transmissions driven by an auxiliary prime mover employed primarily for starting a power plant such as a gasoline turbine or the like. The function of such a power transmission during that phase of the operation is to provide high torques at slow starting speeds. The secondary purpose of the invention is to transmit power from the turbine or power plant back through the transmission to drive the prime mover as a generator or for driving other accessories. The latter phase of operation starts when the power plant has reached its operating speed and is capable of independent operation as a source of power.

Due to the inherent characteristics of a gasoline turbine, high torques at low speeds are required for starting operations. However, during the second phase of the operation, namely, when the gasoline turbine or other power plant is driving the prime mover as a generator, the characteristics of the power delivery provide low torques at high speeds.

Therefore, the general object of this invention is to provide a transmission adapted to efficiently transmit high torques at low speeds in one direction and low torques at high speeds in the opposite direction.

The economical design of hydraulic transmissions frequently requires the use of multiple motors or pumps in p'ace of a single unit of large capacity. At the same time, if high torque or pressures are to be handled at low speeds, it is the general practice to employ multiple units hydraulically connected in parallel. On the other hand, if low-torque high-speed operation is desired, the multiple units may be hydraulically connected in series. When both types of power transmission are required, means must be provided for shifting from series to parallel operation and the reverse.

In the present problem, assume that multiple units are mechanically coupled to the power plant or gasoline turbine. Since the high torque transmission is in one direction, namely, into the power plant, and the low torque at high speeds is away from the power plant, the multiple units must operate as motors in parallel and as pumps in series.

Therefore, the general object of the proposed invention is to provide a hydraulic circuit employing multiple units operating as motors in parallel when transmitting power in one direction and as pumps in series when transmitting power in the reverse direction.

Another object is to provide means for shifting the operation from parallel to series in response to changes in direction of power transmission.

In order to maintain equal division of power or pressure drop through the multiple pumps operating in series, a pressure dividing valve is employed in the circuit.

When multiple pumps of the type employing rotary cylinder barrels and axially reciprocable pistons mounted therein are used, the axial thrust on the second stage pump is above normal. As, for example, when a two-stage pump of the proposed type is employed, the pressure in the cylinders under suction in the first stage is zero and in the cylinders under delivery is, say, one thousand pounds or half the final discharge pressure. Assuming half the pistons under pressure and half under suction, that would develop an average of approximately five hundred pounds per square inch of axial thrust per piston in one direction. In the second stage, the suction force would be one thousand pounds per square inch or the equivalent of the delivery pressure of the first-stage pump. The discharge pistons of the second stage are under a two thousand pounds per square inch load which leaves a net load per piston in the second stage of fifteen hundred pounds per square inch in the form of end thrusts. Therefore, the second-stage pump axial thrust load would be the equivalent of a single-stage pump operating at three thousand pounds per square inch pressure.

In order to balance or absorb some of this excessive axial thrust load, two features are employed herein. The first embodies the mounting of both pumps and their thrust plates back-to-back. By that design the resultant of the axial thrust in two stages is similar to the resultant of one stage operating at the same discharge pressure.

The second feature embodies worm and wheel or helical gears for absorbing directly a portion of the second stage thrust and so correlated to the pump mechanism that the axial load on that motor is further reduced.

Therefore, another object of the proposed structure is to provide a design inherently adapted to absorb the high axial thrust of multi-stage units operating in series.

Further objects and advantages of the present invention will be apparent from the following description, reference being had to the accompanying drawings wherein a preferred form of the present invention is clearly shown.

Figure 1:
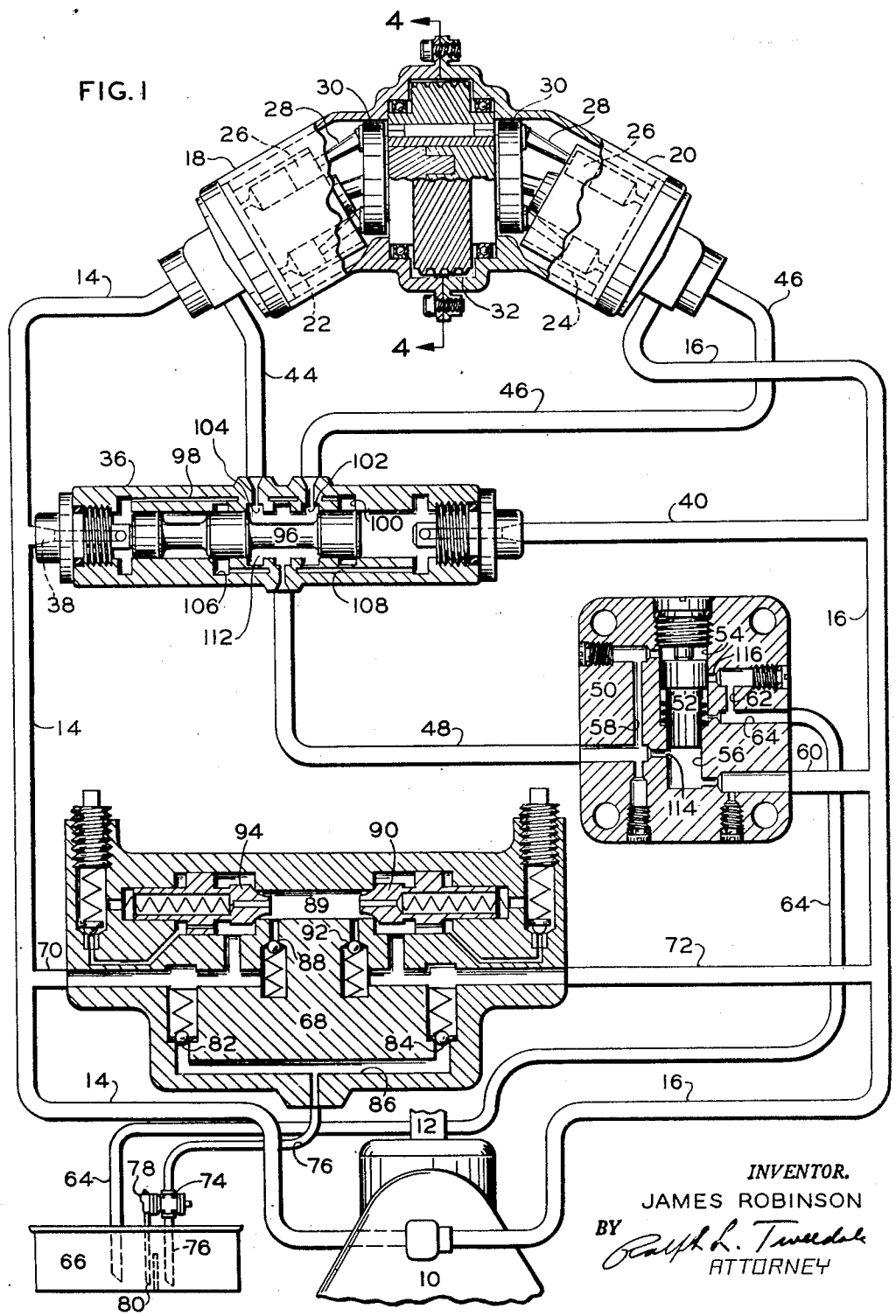
Figure 1 is a schematic diagram of the proposed circuit employing a preferred form of the invention.

In detail, the transmission illustrated in Figure 1 comprises a variable delivery pressure fluid supply pump 10 driven by a prime mover through shaft 12 and connected by pressure and return conduits 14 and 16 to the multiple-pump units 18 and 20. The units 18 and 20 employ rotary cylinder barrels 22 and 24 in which are mounted axially reciprocating pistons 26 connected by rods 28 to the driven elements 30. A worm wheel or spiral gear 32 is coupled to the driven elements 30 and held in driving relation with a worm or spiral gear 34 which in turn is mechanically connected to the load device or power plant.

A four-way valve 36 is connected to the pressure and return conduits 14 and 16 by conduits 38 and 40, respectively. Conduits 44 and 46 connect the outlet of the first-stage pump and the inlet of the second stage pump to the four-way 36. A conduit 48 connects the four-way 36 to the pressure dividing valve 50 where a differential piston 52 is reciprocably mounted in the low and high pressure cylinders 54 and 56, respectively.

The intermediate conduits 44 and 46 are connected through conduit 48 and passage 58 to the high and low pressure cylinders 56 and 54. The return conduit 16 is connected by conduit 60 to the high pressure cylinder 56. A drain line 64 connects the valve 50 to tank 66 and also serves as a relief passage for low pressure cylinder 54.

A combination relief and replenishing valve 68 is connected by conduits 70 and 72 to the pressure and return conduits 14 and 16, respectively, and to a replenishing pump 74 and tank 66 by conduit 76. The replenishing pump 74 is provided with the relief valve 78 and drain line 80. Replenishing fluids may enter the lower pressure conduits 14 or 16 by check valves 82 or 84 from conduit 76 and passage 86.

Excessive pressure in conduit 14 will be relieved through conduit 70, relief valve 94, passage 89, check valve 92, and conduit 72 to conduit 16. Excessive pressure in conduit 16 may be relieved to conduit 72, relief valve 90, passage 89, check valve 88, and conduit 70 to conduit 14.

Figure 3:
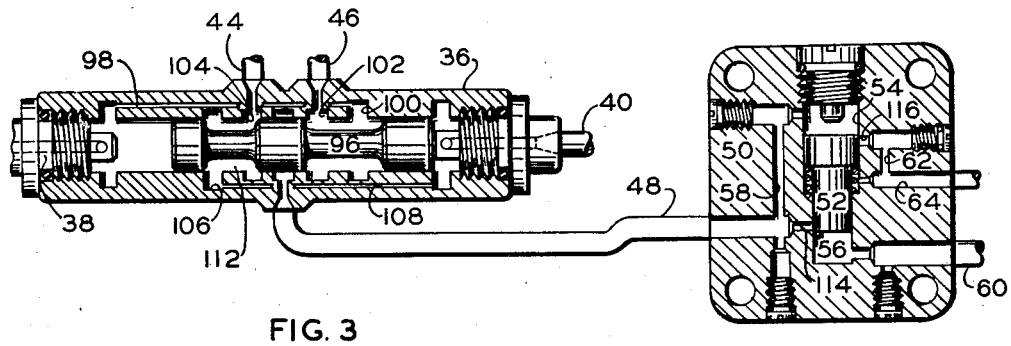
Figure 4:
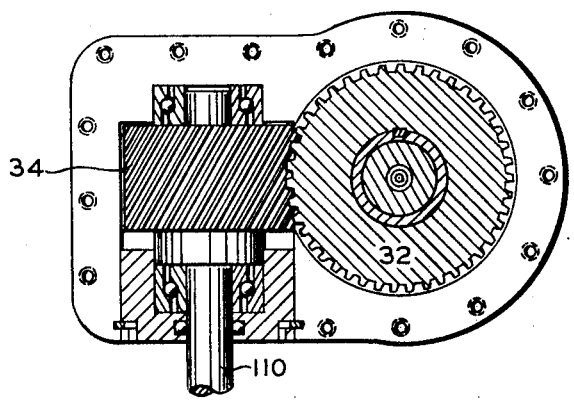
Figure 4 is a section taken on line 4—4 of Figure 1.

In operation, when the pump 10 is started, the pressure in conduit 14 will build up to normal and be communicated through conduit 38 to the four-way 36, thereby shifting the spool 96 as illustrated in Figure 3. In that position, the motor-pump units 18 and 20 are connected in parallel for high torque operation. Pressure fluid is directed to motor 20 through conduit 38, passage 98, ports 100 and 102, and conduit 46. Discharge fluid from motor 18 is directed to conduit 44, ports 104 and 106, passage 108, conduit 40 to conduit 16. As the motors 18 and 20 drive the gears 32 and 34, the power plant or engine to be started is set in motion through load shaft 110.

As the engine reaches its operating speed, it becomes the predominating power source and tends to drive the transmission through the gears 34 and 32 which in turn transmit power to pump 10 which functions as a motor for driving auxiliary load devices or the prime mover as a generator.

When the mechanical power input into the multiple hydraulic units 18 and 20 from the engine is greater than the hydraulic power from the pump 10, then the motor-pump units 18 and 20 actually function as pumps and drive the transmission and pump 10 as a motor. At the transition point, conduit 16 becomes a pressure conduit and conduit 14 the return conduit, and the flow continues in the same direction.

Figure 2:
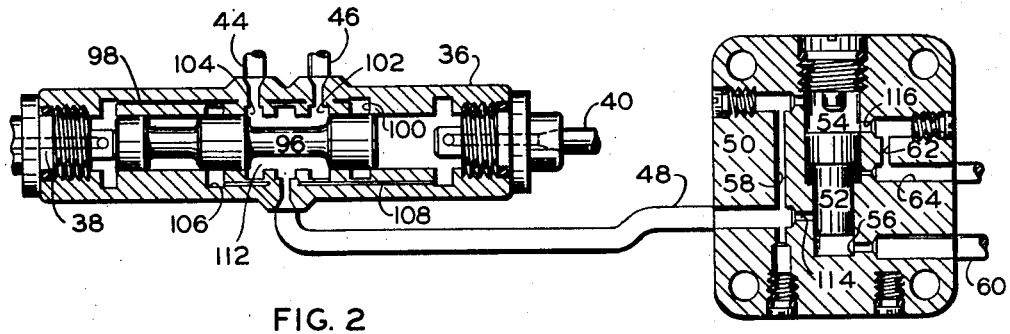
Figures 2 and 3 illustrate the four-way and dividing valve in different operating positions.

With the pressure in conduit 16 being higher than the pressure in conduit 14, spool valve 96 is shifted to the left as illustrated in Figures 1 and 2. When the spool 96 is shifted to the left, conduits 44 and 46 become the intermediate conduits between the first and second stage pumps 18 and 20, respectively, in the series circuit. The interconnection is established between ports 102 and 104 through bore 112 of the four-way 36.

As pointed out above, means for maintaining equal pressure drops across each stage of the multiple pump series is necessary and the pressure dividing valve is provided for that purpose. When the pressures are normal, the differential piston 52 occupies the neutral position shown in Figure 3 wherein piston 52 is blocking both ports 114 and 116.

If the pressure in intermediate conduit (44 and 46) rises above its normal relative pressure, then the pressure in the low pressure cylinder 54 will predominate and force the piston 52 downward as shown in Figure 2, thereby relieving the excess pressure in the intermediate conduit to tank 66 by way of port 116 and passage 62. Thus, the balance in pressure between the intermediate conduit and pressure conduit 16 will be reestablished in the same porportion as the areas of the differential piston.

Assuming next that the first-stage pump 18 has developed excessive slippage or that the second-stage pump 20 has a large displacement, this would tend to drop the pressure in the intermediate conduit and increase the load on the second-stage pump. The relative pressure in conduit 16 would then predominate and the force in high pressure cylinder 56 would overcome the force at low pressure cylinder 54, thus raising the differential piston 52 and uncovering the port 114 as illustrated in Figure 1. High pressure fluid from conduits 16 and 60 would thus be fed into the intermediate conduit (44 and 46) to establish the differential pressure balance and equal load on each pump.

It will thus be seen that the present invention has provided a transmission particularly suitable for driving engines during high-torque low-speed starting operation and for being driven by that same engine at higher speeds. This has been accomplished by employing multiple motor pump units adapted to be automatically connected and operated hydraulically in parallel when driving the engine for high torque delivery and to be connected in series when being mechanically driven by the engine at higher speeds.

While the form of embodiment of the invention as herein disclosed constitutes a preferred form, it is to be understood that other forms might be adopted, all coming within the scope of the claims which follow.

What is claimed is as follows:

1. A hydraulic transmission adapted to transmit high torques at lower speeds in one direction of power delivery and low torques at higher speeds in the opposite direction, comprising a dual-purpose variable displacement unit adapted to operate as a pump or as a motor and hydraulically connected to dual-purpose, mechanically-coupled, multiple units adapted to operate as motors or as pumps, pressure-actuated means for connecting the multiple units in parallel as motors when the pressure in the inlet of the variable displacement unit is lower than that in the outlet and for connecting the multiple units in series as pumps when the pressure in the inlet of the variable displacement unit is higher than that in the outlet.

2. A hydraulic transmission adapted to transmith high torques at lower speeds in one direction of power delivery and low torques at higher speeds in the opposite direction, comprising a dual-purpose variable displacement unit adapted to operate as a pump or as a motor and hydraulically connected to dual-purpose, mechanically-coupled, multiple units adapted to operate as motors or as pumps, and a pressure-controlled selector valve for connecting the multiple units in parallel as motors when the variable displacement unit is driving or in series as pumps when the variable displacement unit is being driven as a motor.

3. A hydraulic transmission employing a prime mover for driving a power plant during low-speed starting operations and for driving the prime mover by the power plant when the torque developed by the power plant exceeds the input torque of the prime mover, comprising a variable displacement pump-motor unit mechanically coupled to a prime mover and adapted to be driven hydraulically and operate as a motor, multiple motor-pump units mechanically coupled to a power plant and hydraulically driven by the variable displacement pump-motor, means for automatically connecting the multiple motor-pumps in parallel when hydraulically operating as motors driven by the variable displacement pump-motor, and means for connecting the multiple motor-pumps in series when operating as pumps and driven mechanically by the power plant.

4. A hydraulic transmission employing a prime mover for driving a power plant during low-speed starting operations and for driving the prime mover by the power plant when the torque developed by the power plant exceeds the input torque of the prime mover, comprising a variable displacement pump-motor unit mechanically coupled to a prime mover and adapted to be driven hydraulically and operate as a motor, multiple motor-pump units mechanically coupled to a power plant and hydraulically driven by the variable displacement pump-motor, and a pressure-controlled selector valve for automatically connecting the multiple motor-pumps in parallel when hydraulically operating as motors driven by the variable displacement pump or connecting the multiple motor-pumps in series when operating as pumps and driven mechanically by the power plant.

5. A hydraulic transmission employing a prime mover for driving a power plant during low-speed starting operations and for driving the prime mover by the power plant when the torque developed by the power plant exceeds the input torque of the prime mover, comprising a variable displacement pump-motor unit mechanically coupled to a prime mover and adapted to be driven hydraulically and operate as a motor, multiple motor-pump units mechanically coupled to a power plant and hydraulically driven by the variable displacement pump-motor, means for automatically connecting the multiple motor-pumps in parallel when hydraulically operating as motors driven by the variable displacement pump-motor, means for connecting the multiple motor-pumps in series when operating as pumps and driven mechanically by the power plant, and a pressure dividing valve for maintaining equal pressure differentials across each of the multiple motor-pumps when operating as pumps in series.

6. A hydraulic transmission employing a prime mover for driving a power plant during low-speed starting operations and for driving the prime mover by the power plant when the torque developed by the power plant exceeds the input torque of the prime mover, comprising a variable displacement pump-motor unit mechanically coupled to a prime mover and adapted to be driven hydraulically and operate as a motor, multiple motor-pump units mechanically coupled to a power plant and hydraulically driven by the variable displacement pump-motor, means for automatically connecting the multiple motor-pumps in parallel when hydraulically operating as motors driven by the variable displacement pump-motor, and means for connecting the multiple motor-pumps in series when operating as pumps and driven mechanically by the power plant, the multiple motor-pumps being of the type employing rotating cylinder barrels with axially reciprocable pistons therein, piston rods connecting the pistons to rotatable drive flanges, and mechanical drive means linking both flanges together for absorbing and balancing axially opposed forces of the multiple motor-pumps.

7. A hydraulic transmission employing a prime mover for driving a power plant during low-speed starting operations and for driving the prime mover by the power plant when the torque developed by the power plant exceeds the input torque of the prime mover, comprising a variable displacement pump-motor unit mechanically coupled to a prime mover and adapted to be driven hydraulically and operate as a motor, multiple motor-pump units mechanically coupled to a power plant and hydraulically driven by the variable displacement pump-motor, means for automatically connecting the multiple motor-pumps in parallel when hydraulically operating as motors driven by the variable displacement pump-motor, and means for connecting the multiple motor-pumps in series when operating as pumps and driven mechanically by the power plant, the multiple motor-pumps being of the type employing rotating cylinder barrels with axially reciprocable pistons therein, piston rods connecting the pistons to rotatable drive flanges, mechanical drive means linking both flanges together for absorbing and balancing axially opposed forces of the multiple motor-pumps, an output shaft, and gearing between the flanges and output shaft and arranged to transmit to the flange of the second-stage, higher pressure, multiple motor-pump, when operating in series as a pump, a thrust in opposition to the piston thrust of that unit.

8. A hydraulic transmission comprising a variable displacement, dual-purpose pump-motor unit connected by hydraulic conduits to multiple, fixed displacement, mechanically-coupled motor-pump units, and means for selectively connecting the multiple units in parallel when functioning as motors or connecting the multiple units in series when functioning as pumps.

9. A hydraulic transmission comprising a variable displacement, dual-purpose pump-motor unit connected by hydraulic conduits to multiple, fixed displacement, mechanically-coupled motor-pump units, means for selectively connecting the multiple units in parallel when functioning as motors or connecting the multiple units in series when functioning as pumps, and a pressure-actuated four-way valve adapted to connect the multiple units in parallel when the inlet pressure of the units multiple is greater than the outlet pressure and in series when the outlet pressure exceeds the inlet pressure.

10. A hydraulic transmission comprising a variable displacement, dual-purpose pump-motor unit connected by hydraulic conduits to multiple, fixed displacement, mechanically-coupled motor-pump units, means for selectively connecting the multiple units in parallel when functioning as motors or connecting the multiple units in series when functioning as pumps, and a pressure dividing valve including a piston valve adapted to relieve excess pressure or fortify sub-normal pressures for maintaining equal pressure differentials across each of the multiple motor-pumps when operating as pumps in series.

11. A hydraulic transmission comprising a variable displacement, dual-purpose pump-motor unit connected by hydraulic conduits to multiple, fixed displacement, mechanically-coupled motor-pump units, and means for selectively connecting the multiple units in parallel when functioning as motors or connecting the multiple units in series when functioning as pumps, the multiple motor-pumps being of the type employing rotating cylinder barrels with axially reciprocable pistons therein, piston rods connecting the pistons to rotatable drive flanges, and mechanical drive means linking both flanges together for absorbing and balancing axially opposed forces of the multiple motors.

12. A hydraulic transmission comprising a variable displacement, dual-purpose pump-motor unit connected by hydraulic conduits to multiple, fixed displacement, mechanically-coupled motor-pump units, and means for selectively connecting the multiple units in parallel when functioning as motors or connecting the multiple units in series when functioning as pumps, the multiple motors being of the type employing rotating cylinder barrels with axially reciprocable pistons therein, piston rods connecting the pistons to rotatable drive flanges, mechanical drive means linking both flanges together for absorbing and balancing axially opposed forces of the multiple motor-pumps, an output shaft, and gearing between the flanges and output shaft and arranged to transmit to the flange of the second-stage, higher pressure, multiple motor-pump, when operating in series as a pump, a thrust in opposition to the piston thrust of that unit.

JAMES ROBINSON.

REFERENCES CITED

The following references are of record in the file of this patent:

UNITED STATES PATENTS

| Number | Name | Date |
| --- | --- | --- |
| 2,079,268 | Wiedmann | May 4, 1937 |

FOREIGN PATENTS

| Number | Country | Date |
| --- | --- | --- |
| 184,455 | Great Britain | Oct. 18, 1923 |
| 519,086 | Great Britain | Mar. 15, 1940 |